(12) United States Patent
Heinrich et al.

(10) Patent No.: US 8,323,136 B2
(45) Date of Patent: Dec. 4, 2012

(54) TENSIONING RAIL WITH A CHANNEL DEVICE IN THE PRESSURE BODY

(75) Inventors: Dag Heinrich, Penzberg (DE);
Christian Bauer, Munich (DE);
Markus Aurnhammer, Munich (DE);
Renzo Perissinotto, Dachau (DE)

(73) Assignee: IWIS Motorsysteme GmbH & Co. KG, Munich (DE)

( * ) Notice: Subject to any disclaimer, the term of this patent is extended or adjusted under 35 U.S.C. 154(b) by 592 days.

(21) Appl. No.: 12/302,649

(22) PCT Filed: Feb. 6, 2007

(86) PCT No.: PCT/EP2007/001000
§ 371 (c)(1),
(2), (4) Date: Feb. 2, 2009

(87) PCT Pub. No.: WO2007/137635
PCT Pub. Date: Dec. 6, 2007

(65) Prior Publication Data
US 2009/0239692 A1 Sep. 24, 2009

(30) Foreign Application Priority Data

May 30, 2006 (DE) ..................... 20 2006 008 573 U

(51) Int. Cl.
*F16H 7/08* (2006.01)
*F16H 7/22* (2006.01)

(52) U.S. Cl. ........................ 474/110; 474/111

(58) Field of Classification Search .................. 474/101, 474/110, 111, 140
See application file for complete search history.

(56) References Cited

U.S. PATENT DOCUMENTS

| | | | |
|---|---|---|---|
| 5,184,982 A * | 2/1993 | Shimaya et al. | 474/101 |
| 5,879,256 A * | 3/1999 | Tada | 474/110 |
| 2003/0092521 A1* | 5/2003 | Konno | 474/111 |

FOREIGN PATENT DOCUMENTS

| | | |
|---|---|---|
| DE | 103 440 12 A1 | 4/2004 |
| DE | 20 2004 013 921 U1 | 2/2006 |
| GB | 2 254 671 A | 10/1992 |
| JP | 2004-116680 A | 4/2005 |

* cited by examiner

*Primary Examiner* — William E Dondero
(74) *Attorney, Agent, or Firm* — Leydig, Voit & Mayer, Ltd.

(57) ABSTRACT

The present invention relates to a tensioning rail for a chain drive, in particular a timing chain drive of an internal combustion engine, comprising a base body (11) and a pressure body (1) connected to the base body which provides a pressing area (2) for pressing a chain tensioner, wherein a pressing surface (4) of the pressure body (1) which faces the chain tensioner during use is formed with a channel device (5). The invention also relates to a tensioning device for an endless drive element, in particular a timing chain of an internal combustion engine, comprising a tensioning rail which can be pushed on the endless drive element having a base body (11) and a pressure body (1) which can be connected to the base body (11) and which provides a pressing area, and having a chain tensioner which presses on the pressing area (2) of the pressure body (1).

18 Claims, 3 Drawing Sheets

TENSIONING RAIL WITH A CHANNEL DEVICE IN THE PRESSURE BODY

The present invention relates to a tensioning rail for a chain drive, particularly for a timing chain drive of an internal combustion engine, comprising a base body and a pressure body connected to the base body, which provides a pressing area for pressing a chain tensioner. Furthermore, the present invention relates to a tensioning device for an endless drive element, particularly a timing chain of an internal combustion engine, comprising a tensioning rail which can be pushed on the endless drive element and has a base body and a pressure body which is connectable to the base body and which provides a pressing area, and a chain tensioner which presses on the pressing area of the pressure body.

Tensioning rails for chain drives are above all used in automotive vehicle engines in which the camshaft is driven via a timing chain. To keep the chain under a defined tension and to compensate for tolerances, particularly also for an extension of the chain occurring after long use, the chain is tensioned via a tensioning rail, which is mostly pressed on by resilience or hydraulically.

In general, corresponding tensioning rails are formed on a base body with a slideway lining or slideway lining body mounted thereon. The tensioning rail is pivotably mounted at one end and is pressed with its slideway lining against the chain. In this context the base body generally comprises a pressing area for pressing on a chain tensioner which can e.g. be arranged at the side of the base body facing away from the slideway lining. During use in an internal combustion engine the chain tensioner is often connected to the motor oil supply, so that an enhanced chain tension is also producible at an increased speed.

It is known from DE 20 2004 013 921.9 that the pressing area is configured as a separate pressure member which is connectable by way of a plug-type lock connection to the base body. As a result, the pressure member can here for instance be exchanged easily upon wear at a later time without the need for replacing the whole tensioning rail. Furthermore, it is possible to use a corresponding tensioning rail particularly under confined installation conditions.

The known tensioning rails have proved their worth in practice, but attempts are still made to improve the tensioning rails, and particularly the action of the tensioning rail during use.

This object is achieved for a tensioning rail for a chain drive, particularly a timing chain drive of an internal combustion engine, comprising a base body and a pressure body which is connected to the base body and provides a pressing area for pressing a chain tensioner, in that a pressing surface of the pressure body which faces the chain tensioner during use is formed with a channel device.

The configuration of a channel device in the pressing surface of the pressure body offers several advantages. On the one hand, the channel device provides for a vent which during use can cooperate with the vent bore of the chain tensioner so as to ensure reliable venting. At the same time the tensioning system and the damping system are decoupled acoustically because the piston and the pressing surface are made from different materials. Since the pressure body is produced as an element separable from the tensioning rail, it can be exchanged easily upon wear and at the same time it is possible to provide different pressure bodies equipped with differently designed channel devices so as to select a corresponding pressure body in conformity with the respective purpose of use.

According to one embodiment the channel device may extend as a groove longitudinally over the whole pressing surface. In practice, the design of a groove has turned out to be a particularly simple embodiment that can be manufactured by using known machines, so that the manufacturing costs of the pressure body can be kept low. It is ensured through the formation of the groove over the whole pressing area that particularly with respect to the venting function a continuous unhindered venting operation is ensured.

Advantageously, the groove is formed along a center line of the pressing surface. This embodiment ensures that the configuration of the groove has no adverse effect on the strength of the pressure body; at the same time it helps to orient the vent hole of the chain tensioner relative to the groove.

Furthermore, the pressing surface can be made concave. According to another embodiment the pressing surface can be made convex. A correspondingly designed pressure body is suited for very different applications, i.e. under confined use and also with uses offering more space. Depending on the desired application, a concave or a convex pressing area may here be chosen, depending on how large the contact area between the pressure body and the chain tensioner is desired to be. According to different preferred embodiments the pressing area can also be made square, round, rectangular or planar.

According to a further preferred embodiment the pressure body is locked with the base body. A lock connection offers a very simple possibility of connection between the base body and the pressure body, with a corresponding lock connection being made detachable or non-detachable. Depending on the design of the lock connection, an installation is also possible without tools, so that the manufacturing costs are low.

Advantageously, the pressure body is provided with at least one lock element at the side opposite the pressing surface. The configuration of a corresponding lock element at the side facing the pressing surface has turned out to be particularly advantageous because a particularly simple connection of the pressure body to the base body is thereby achieved in that the locking can be accomplished inside the tensioning rail or outside the tensioning rail.

Advantageously, the lock element may comprise a web element and a lock nose bent therefrom and extending to the outside. This effects a locking in the interior of the base body, with the lock noses engaging into engagement openings formed for this purpose in the interior of the tensioning rail. The engagement openings may here be designed as through openings so as to ensure a detachment of the lock element. When the web element and the lock nose are arranged inside the base body, this offers protection to the web elements, whereby the stability of the connection is increased.

Although the pressure body and the base body can be made from the same material, it is preferred that the pressure body is made from a different material. It is thereby possible to select the different materials for the pressure body and for the base body independently of each other on the basis of the special properties desired. This can further enhance the strength of the tensioning rail.

Advantageously, the pressure body is made from a material selected from the group of wear-resistant materials, dampening materials and materials having a low coefficient of friction and combinations thereof. In practice these materials have turned out to be particularly suited.

Advantageously, the pressure body can also be made from different materials, i.e. the area of the web element and the lock nose and part of the pressing area may consist of a material differing from that of the pressing surface. Equally, the web element together with lock nose can be made from a material differing from that of the pressure body itself. It is thereby also possible to achieve special properties particularly in the area of the pressing surface, and materials can here inter alia be used whose costs rule out the use for the whole pressure body.

The object of the present invention is further achieved by a tensioning device for an endless drive element, particularly a timing chain of an internal combustion engine, comprising a tensioning rail which can be pushed on the endless drive element and has a base body and a pressure body which is connectable to the base body and provides a pressing area, and a chain tensioner which presses on the pressing area of the pressure body, characterized in that a pressing surface of the pressure body is formed with channel devices which during use have assigned thereto a vent hole of the chain tensioner. Since the vent hole of the chain tensioner during use is directly arranged on the channel device, a continuous venting operation without any problems can be ensured thereby. The configuration of the channel device is here a simple and inexpensive measure. The term "assigned" means that the vent hole of the chain tensioner is arranged in the area of the channel device or rests on the channel device such that the vent hole has direct access to the channel device, and the chain tensioner itself presses on the pressing surface to the right and left side next to the channel device.

Advantageously, the tensioning rail is configured as has been described above.

Furthermore, the width of the channel device can substantially correspond to the diameter of the vent hole of the chain tensioner. This also guarantees unhindered venting without the pressing force of the chain tensioner being reduced.

According to a further preferred embodiment the chain tensioner 12 comprises a tensioning piston 14 in which the vent hole 15 is arranged on the front side 16 thereof, as shown in FIG. 5. Corresponding chain tensioners have already proven their worth in practice and are used in many ways.

An embodiment of the present invention shall now be explained in more detail with reference to a drawing, in which.

Figure 1:
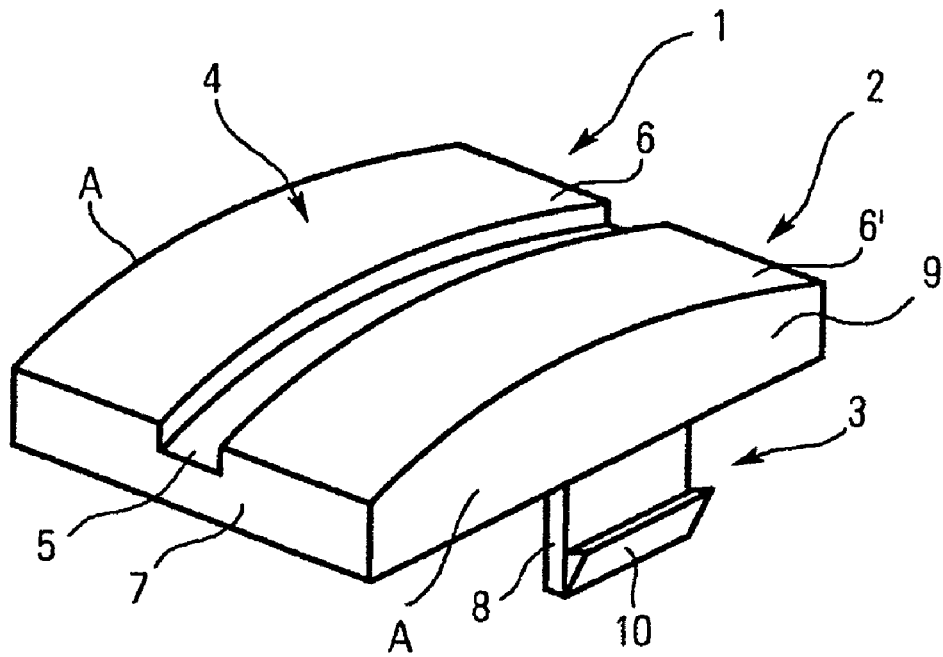
FIG. 1 is a perspective view of a pressure body according to the invention.
Figure 2:
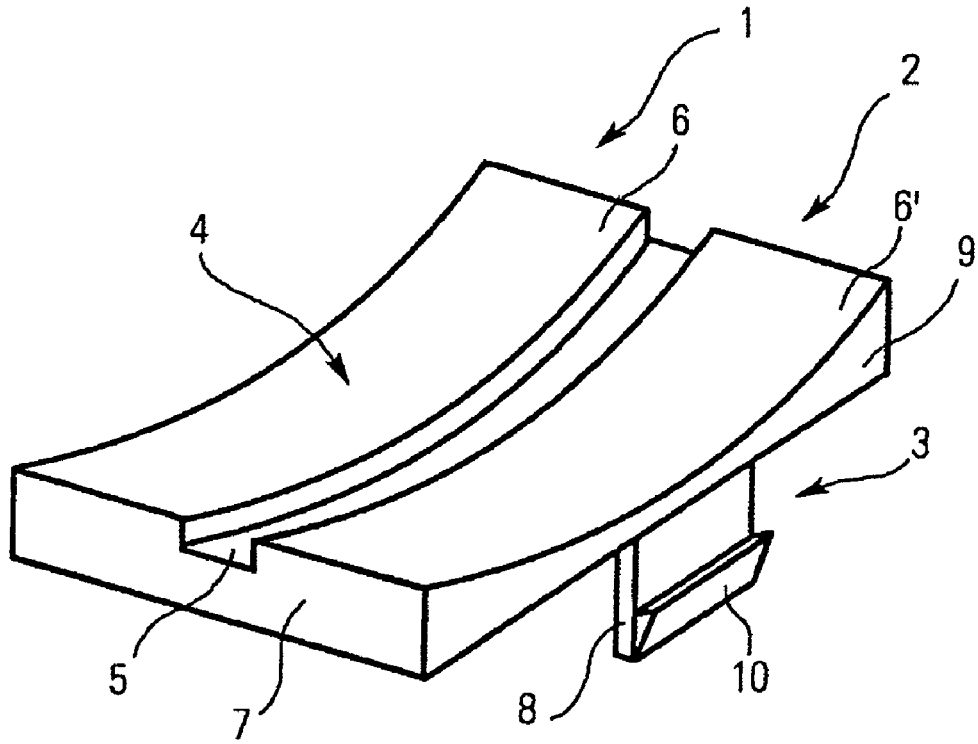
FIG. 2 is a perspective view of a pressure body according to the invention according to a further embodiment.
Figure 3:
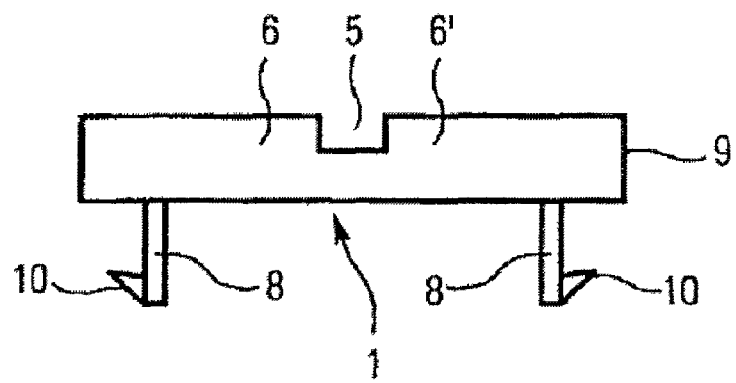
FIG. 3 is a section taken along line A-A of FIG. 1.

The pressure body 1 shown in FIGS. 1 to 3 comprises a pressing area 2 and a connection or lock area 3 that are connected to each other. The pressing area 2 comprises the pressing surface 4 onto which the chain tensioner is pressed during use. The connection or lock area 3 is formed at the side of the pressing area 2 opposite the pressing surface 4.

A groove 5 which subdivides the pressing surface 4 into two partial elements is formed in the area of the pressing surface 4. The groove extends over the whole length of the pressing surface 4, i.e. from one side to the opposite side, and terminates in the respective opposing side surfaces 7 of the pressure body 2. The side surfaces 7 correspond to the side surfaces which are arranged at the shorter sides of the pressing surface 4 and are approximately vertical. Furthermore, the groove is made straight and extends approximately in a line relative to the center line of the pressing surface 4, so that the pressing surface 4 is subdivided into two partial surfaces of about the same size. Each of said partial surfaces forms a decoupling element 6, 6' with which acoustic decoupling is achieved.

Preferably, the groove is given a width smaller than half the width of a partial element of the pressing surface 4, preferably about 40% of this width. The depth of the groove corresponds to about one third of the height of the pressing area, measured on the side surfaces 7 of the pressing area in which the groove 5 terminates.

As becomes apparent from FIGS. 1 and 2, the pressing surface 4 in a top view has an approximately rectangular contour, the pressing surface itself however being given a curved shape; either, as shown in FIG. 1, a concave one or, as shown in FIG. 2, a convex one. The curvature is here provided in the same direction as the groove, i.e. in the direction of the longer side of the pressing surface 4. The groove extends over the whole pressing surface with the same depth and the same width.

At the side opposite the pressing surface 4, a fixing element 3 is formed. Said fixing element is configured in the form of lock elements, with only one lock element being shown in FIG. 1 and FIG. 2, respectively. A complementary lock element is arranged at the opposite side of the pressing area. Each lock element comprises a web 8 which extends downwards approximately vertically from the pressing area. The web 8 is not arranged directly on the edge of the pressing area, but is spaced apart at a predetermined distance from the respective side surfaces of the pressing area.

FIG. 3 shows a section taken along line A-A of FIG. 1 of the pressure body according to the invention, including lock elements, which illustrates especially the arrangement of the lock elements.

The distance of the webs 8 from the side surfaces 9 is here about the width of the respective base body webs into which the pressure body 1 is inserted. Each web element 8 comprises a lock nose 10 which is bent away from the web element and extends from the web element 8 to the outside, i.e. in the direction of the longer side surfaces 9. In the illustrated embodiment the lock noses 10 are configured as angle elements which extend towards the pressing area 2 and are configured to taper at their tip.

According to another embodiment a single web element 8 can also be formed in the middle of the pressing area, with lock noses then extending at both sides from the web element to the outside.

During assembly the pressure body is connected to the base body such that the webs extend into the interior of the base body and the lock noses are received by correspondingly shaped receiving openings.

It is however also possible to design the lock elements such that they grip around the base body from the outside.

Figure 4:
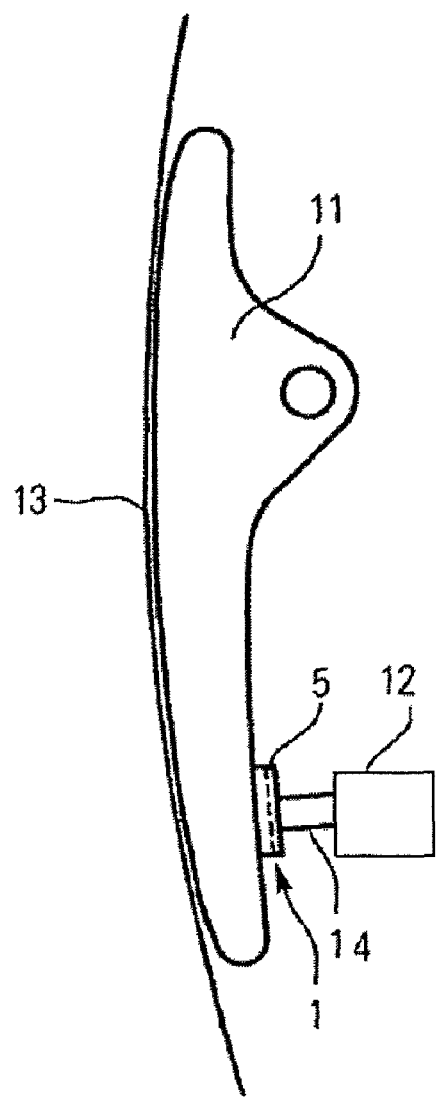
FIG. 4 is an overview diagram showing the tensioning rail according to the invention in use.
Figure 5:
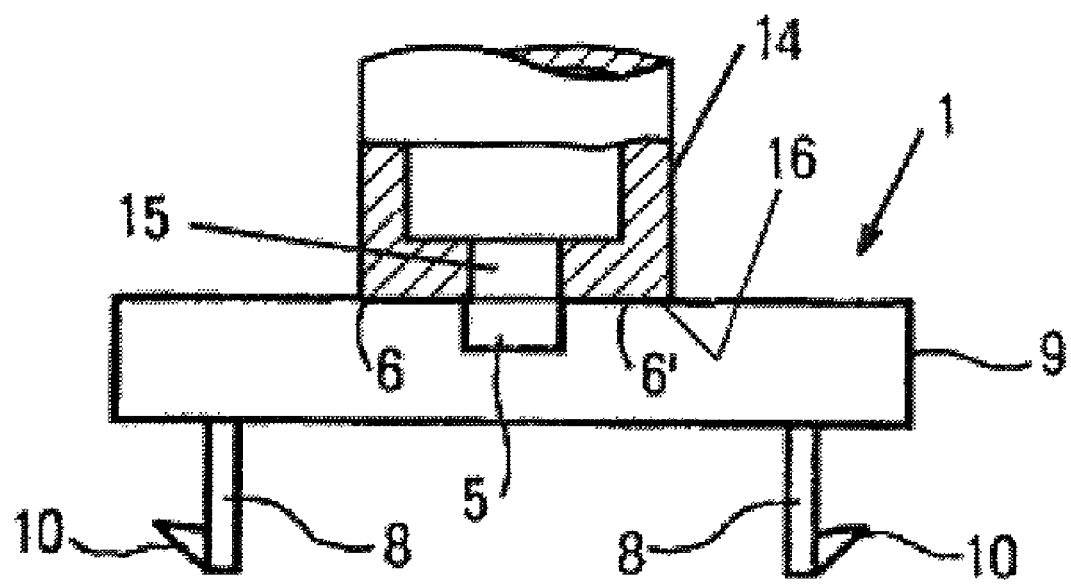
FIG. 5 is a section of the pressure body shown in FIG. 1 in use in accordance with the invention.

FIG. 4 shows the tensioning rail of the invention in use, the tensioning rail comprising the base body 11 and the pressure body 1 connected thereto. The pressure body corresponds to the pressure body 1 shown in FIG. 2.

The tensioning rail is here pressed by means of a chain tensioner 12 against a chain, particularly a timing chain 13. The chain tensioner presses against the support surface 4 of the pressure body and is arranged on the support surface such that a vent hole formed on the face in the piston of the chain tensioner is arranged in the area of the groove 5 of the pressure body.

The invention claimed is:

1. A tensioning rail for a chain drive, particularly for a timing chain drive of an internal combustion engine, comprising a base body and a pressure body which is connectable to the base body and provides a pressing area for pressing a chain tensioner, wherein a pressing surface of the pressure body which faces the chain tensioner during use and contacts said chain tensioner during use is formed with a groove, wherein the groove is defined, at least in part, by a bottom surface that is disposed at an offset distance from the pressing surface and extends parallel to the pressing surface such that the bottom surface of the groove is disposed at the offset distance from the chain tensioner and provides a venting when the chain tensioner is in contact with the pressing surface.

2. The tensioning rail according to claim 1, wherein the groove extends longitudinally over the whole pressing surface.

3. The tensioning rail according to claim 2, wherein the groove is formed along a center line of the pressing surface.

4. The tensioning rail according to claim 1, wherein the pressing surface is made concave.

5. The tensioning rail according to claim 1, wherein the pressing surface is made convex.

6. The tensioning rail according to claim 1, wherein the pressure body is locked with the base body.

7. The tensioning rail according to claim 1, wherein the pressure body is provided with at least one lock element at the side opposite the pressing surface.

8. The tensioning rail according to claim 7, wherein the lock element comprises a web element and at least one lock nose that projects from an outwardly facing side of the web element.

9. The tensioning rail according to claim 8, wherein the pressure body is made from a material differing from that of the base body.

10. The tensioning rail according to claim 9, wherein the pressure body is made from a material selected from the group of wear-resistant materials, dampening materials and materials having a low coefficient of friction and combinations thereof.

11. The tensioning rail according to claim 10, wherein the pressing surface is made from a material differing from that of the pressing area.

12. The tensioning rail according to claim 1, wherein the pressure body is made from a material differing from that of the base body.

13. The tensioning rail according to claim 1, wherein the pressure body is made from a material selected from the group of wear-resistant materials, dampening materials and materials having a low coefficient of friction and combinations thereof.

14. The tensioning rail according to claim 1, wherein the pressing surface is made from a material differing from that of the pressing area.

15. A tensioning device for an endless drive element, particularly a timing chain of an internal combustion engine, comprising:
  a tensioning rail which can be pushed on the endless drive element, the tensioning rail comprising a base body and a pressure body which is connectable to the base body and provides a pressing area for pressing a chain tensioner, wherein a pressing surface of the pressure body, which faces the chain tensioner during use and contacts said chain tensioner during use, is formed with a channel device which is configured as a groove, wherein the groove includes a bottom surface that is disposed at an offset distance from the pressing surface and provides a vent, and
  a chain tensioner which contacts and presses on the pressing surface of the pressure body but does not contact the bottom surface of the groove, with a vent hole of the chain tensioner being arranged on the channel device during use.

16. The tensioning device according to claim 15, wherein the width of the channel device corresponds substantially to the diameter of the vent hole of the chain tensioner.

17. The tensioning device according to claim 16, wherein the chain tensioner comprises a tensioning piston the face end of which comprises the vent hole.

18. The tensioning device according to claim 15, wherein the chain tensioner comprises a tensioning piston the face end of which comprises the vent hole.

* * * * *